Oct. 11, 1949.  E. J. LEARY  2,484,041
LIFTING DEVICE
Filed Jan. 5, 1945
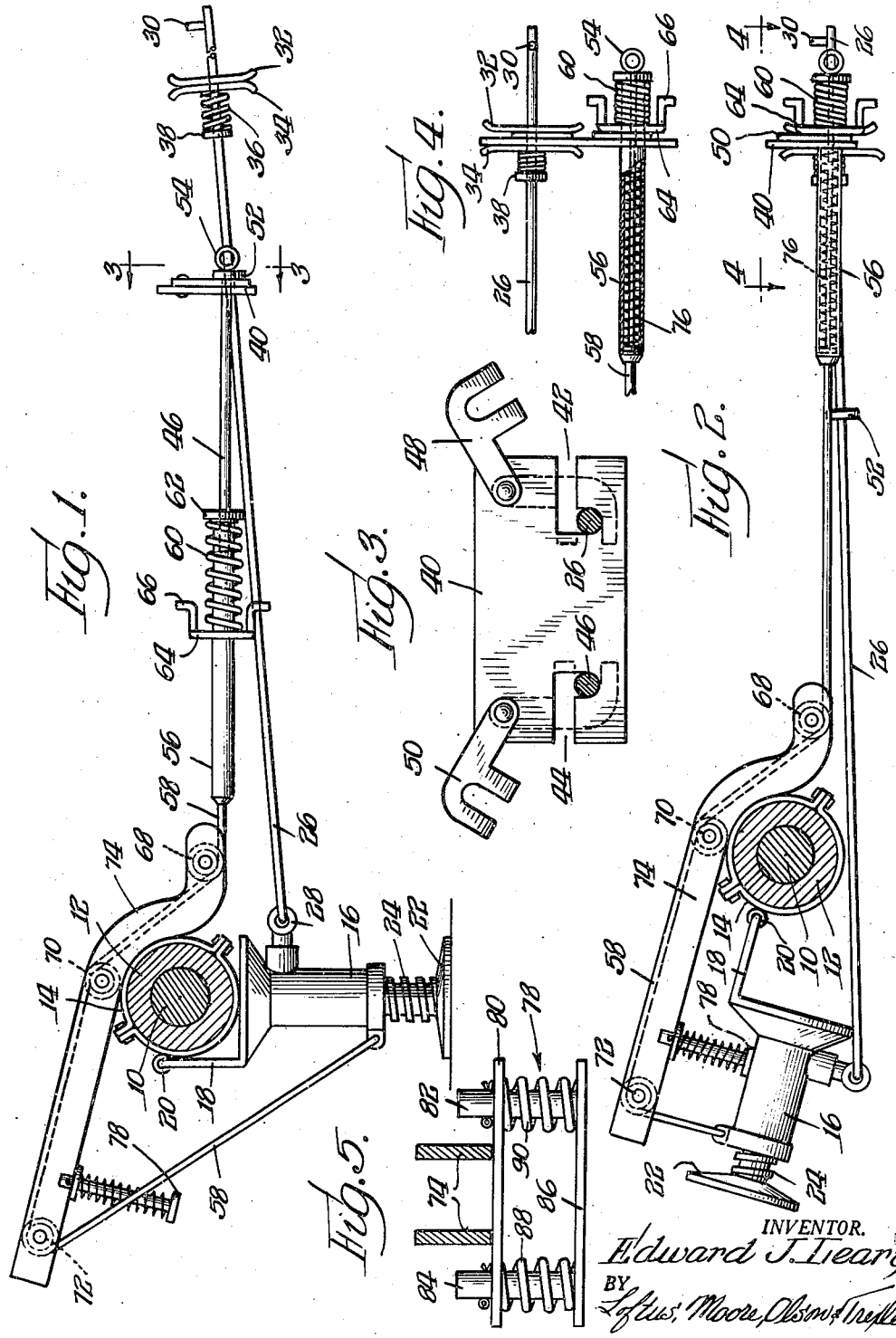
INVENTOR.
Edward J. Leary
BY
Loftus, Moore, Olson & Trexler
Attys.

Patented Oct. 11, 1949

2,484,041

UNITED STATES PATENT OFFICE 2,484,041

LIFTING DEVICE

Edward J. Leary, San Francisco, Calif.

Application January 5, 1945, Serial No. 571,438

5 Claims. (Cl. 254—86)

The present invention relates to a lifting system and more particularly to a lifting system suitable for permanent attachment to a part of a vehicle.

It has long been recognized that it is difficult to properly place a jack beneath a vehicle to raise the vehicle, particularly for the purpose of effecting repairs such as the removal or changing of automobile tires, and equipping tires with chains in inclement weather on snowy and icy roads. During the recent years passenger automobiles have been provided with jacks which engage the bumper of the car, but these are not entirely satisfactory since they require raising the body of the car to a considerable height before the resilient springs will raise the wheel or axle an amount sufficient to permit the necessary repair work. Under certain conditions of terrain the vehicle is insecurely supported with the result that frequently the vehicle is moved so as to drop off the jack which usually results in some damage. It has heretofore been suggested to provide an automobile or vehicle jack arrangement which may be attached permanently to the frame or axle of the vehicle. Such an organization provides a jack which is normally carried in a retracted position but which may be readily moved to operative position conveniently and readily by an operator. It of course is desirable to construct such an arrangement so that the device is readily and easily attached to or incorporated in the vehicle structure and also that such an arrangement might be economically manufactured. In accordance with the present invention an improved arrangement of this sort is provided utilizing relatively few parts which are arranged to maintain in a cushioned position the jack when in inoperative position.

It is therefore an object of the present invention to provide an improved jack normally secured to a vehicle which may be actuated remotely therefrom, and which is normally carried in retracted position and readily movable to operative position by an operator.

Another object of the present invention is to provide an improved jack secured to a part of a vehicle in pivoted relation thereto for selective movement to retracted and operative positions by actuating means remotely located relative to the jack.

It is another object of the present invention to provide in a vehicle jack of the type referred to an arrangement which normally retains the vehicle jack in non-operative position in a cushioned resilient manner to minimize the effects of vibration and wear.

Other and further objects subsequently will become apparent by reference to the following description taken in connection with the accompanying drawing wherein Figure 1 is a side elevation showing the jack in operative position;

Figure 2 is a side elevational view showing the jack moved to its non-operative position as normally carried by the vehicle;

Figure 3 is a view illustrating a latching arrangement as seen in the direction of the arrows along the line 3—3 of Figure 1;

Figure 4 is a top view of a portion of Figure 2; and

Figure 5 is a detailed view of a portion of the resilient cushioning means for engaging the jack in inoperative or retracted position.

The present invention provides a jack construction which may normally be associated with any vehicle such as a passenger automobile, truck, bus, semi-trailer, or the like for raising the same for repairs, particularly for the purpose of effecting tire repairs. To simplify the description it may be assumed that the invention shown is being applied to a passenger automobile. Figure 1 therefore shows a vehicle axle 10 carried by an axle housing 12. The clamping band 14 is arranged to surround the housing 12 so as to secure in pivotal relationship a jack 16. The upper surface of the jack is provided with an L-shaped member 18 pivotally secured to a portion of the clamping band 14 by a hinged connection 20. The jack 16 is of the type having a supporting foot 22 connected to the internal structure of the jack by a threaded shaft 24, which in turn is actuated by a suitable mechanism, capable of being actuated by a rotatable element. In the position shown in Figure 1, the jack 16 is directly beneath the axle 10 and the housing 12 therefor. Coupled to the internal mechanism of the jack which serves to elevate the vehicle is a control rod 26 connected by a link joint 28. When the jack is lowered for use as shown in Figure 1, the control rod 26 extends beyond the body of the vehicle a distance sufficient so that a crank may be connected to its extremity. Adjacent its extremity there is provided a crank engaging pin 30. At a short distance from the crank engaging pin there is positioned a plate 32 which in cooperation with a second oppositely arranged similar plate 34 serves to hold the control rod 26 in position during the time that the jack is not in use. The plate 34 is resiliently biased toward the plate 32 by a spring 36 acting against a collar 38 secured to the control rod 26.

In the position shown in Figure 1 the control rod 26 is held in that position by a plate 40 shown in detail in Figure 3. The plate 40 is provided with two L-shaped slots 42 and 44 which are adapted to receive the rod 26 and another rod 46 which is connected to a jack raising mechanism. The L-shaped slots 42 and 44 are closed by keeper plates 48 and 50. The rod 26 at a point immediately in front of the keeper plate 48 is provided with a collar 52 secured in position. The collar 52 preferably is of the type incorporating a rotatable band structure so that the collar may engage the keeper plate 48 to retain the jack in lifting position, and the collar may remain stationary while the rod 26 is being rotated to actuate the jack.

The extension rod 46 which terminates in an eyelet 54 extends into a sleeve or hollow tubular member 56 which is joined at one end to a flexible cable 58. A coil spring 60 surrounds one end of the tubular member 56. The coil spring 60 operates between a collar 62 rigidly secured to the end of the tubular member 56 and a plate 64 provided with suitable finger grips 66. The flexible cable 58 passes over a plurality of rollers 68, 70, and 72 mounted within a channel-like housing 74 which is positioned above the vehicle axle 10. The channel member 74 may be secured to the vehicle in any suitable manner dependent upon the type of vehicle and its construction. It of course will be appreciated that where the vehicle is provided with a frame suitable for supporting the rollers 68, 70, and 72, that the auxiliary channel member 74 may be dispensed with. The flexible cable 58 is secured to an intermediate point on the jack 16. When the rod 26 and collar 52 are disengaged from the L-shaped slot 42 in the plate 40, a spring 76 within the tubular member 56, as seen in Figure 4 acts to cause the flexible cable 58 to raise the jack to its retracted position. The spring 76 within the housing 56 interconnects one end of the rod 46 with one end of the housing 56. In the position shown in Figure 1 the eyelet 54 of the rod 46 abuts the plate 40. The spring 76 therefore is compressed between the end of the rod 46 and the opposite end of the housing 56. When the rod 26 is removed from the notch 42 so that the collar 52 is permitted to be moved to the rim of the plate 40, the spring 76 begins to raise the jack 16. The spring 76 raises the jack to substantially its uppermost normal position and subsequently the spring 60 is compressed to some degree by the member 64 being moved to the forward side of the plate 40. The spring 76 thereupon expands to its fullest extent so as to position the eyelet 54 against the end of the housing 56. The jack is adapted to engage a resilient cushion 78 mounted on the channel-like member 74. The resilient cushion 78 is shown in detail in Figure 5. The resilient cushion 78 may comprise a plate 80 secured to the underside of the channel member 74. The plate 80 is provided with suitable apertures for receiving a plurality of rods 82 and 84 which are secured to a plate 86. The rods are surrounded with resilient biasing springs 88 and 90 interposed between the plates 80 and 86. The cushion 78 as subsequently will become apparent serves to help retain in a resilient manner the jack 16 in its retracted position.

In Figure 2 the jack 16 is shown in its retracted position with the extension member 76 in engagement with the cushion 78. As was previously stated the force exerted by the spring 76 between the tubular member 56 and the control rod 46 will cause the cable 58 to be actuated to retract the jack. When the end of the tubular member reaches the proximity of the plate 40 which is secured to an accessible part of the vehicle body, the rod 46 is removed from its L-shaped slot 44 and the operator grasps the finger grip 66 of the plate 64 so that this plate may be moved in front of the plate 40 and its keeper plate 50. When this has been done the relationship of the parts will be as shown in Figures 2 and 4 with the plate 64 in contact with the keeper 50, and the spring 60 will be compressed partially so as to exert a predetermined biasing force upon the flexible cable 58. The rod 46 is telescoped into the weatherproof tubular housing member 56 by the action of the spring 76. The rod 26 is thereupon inserted in its L-shaped slot 42 of the plate 40 so that the two plates 32 and 34 are on opposite sides of the plate 40. As may be seen from Figure 4 the spring 36 is compressed so that the rod 26 is resiliently held in position so as to obviate the possibility of noise being generated due to vibration.

While the arrangement shown in Figures 1 and 2 for convenience has indicated that the jack has been attached to the rear axle of an automobile, it of course will be understood that each of the axles both front and rear adjacent each wheel is to be provided with an arrangement such as illustrated. Thus the retaining plate 40 is secured adjacent a convenient part of the chassis or body of the vehicle. It also will be appreciated that while in many instances it is preferable to provide an arrangement whereby the pivotal connection for the jack is provided by a clamp surrounding the axle that other arrangements may be employed which will operate to place the jack in operative position immediately beneath the axle and which will permit the jack in its inoperative position to be moved out of the way and resiliently retained in such position.

The present invention therefore provides relatively simple means, from the manufacturing, installing and operating standpoints, for readily and quickly positioning a jack in operating position and for subsequently elevating the jack to inoperative position. Due to the action of the resilient spring members 60, 88, and 90 the jack is retained in inoperative position by a resilient cushioning action so that any shocks and vibrations are adequately absorbed so as to prevent undue wear and generation of noise. The present invention is particularly useful where the terrain is uneven, muddy, or covered with snow and ice. Tire changing is readily made possible for those who ordinarily are not physically able to undertake such an effort or are not properly dressed therefor. Chains may readily be attached and detached without danger of slipping or faulty jacks, thereby to facilitate safer driving. It furthermore will be seen that once the jack has been moved into operating position and the elevation of the vehicle has been initiated that the jack cannot be displaced thus obviating entirely the disadvantages of prior jack arrangements.

The present arrangement is particularly advantageous in those regions where snow, ice, and slush are prevalent for a great portion of the year. The spring which raises the jack to its retracted position is in a weatherproof enclosure normally located a considerable distance above the roadbed at a point on the chassis accessible to the operator. The rise and fall of the chassis relative to the axle of the car is compensated for by the resilient buffer which engages the jack and the spring located about the jack retracting spring enclosure so that no excessive strain is placed on the flexible cable or other parts.

While for purposes of illustrating and describing the present invention a certain preferred embodiment has been disclosed in the drawing, it is to be understood that the invention is not to be limited thereby since such variations and changes in the configuration of the components and in their arrangements are contemplated as may be commensurate with the spirit and scope of the invention as set forth in the appended claims.

This invention is hereby claimed as follows:

1. The combination with a vehicle, a jack, pivot means mounted on said vehicle to support said jack with respect thereto selectively to operating or retracted positions, cable means for raising said jack to retracted position, a telescopic unit associated with the outer end of said cable resilient latching means associated with the outer end of said telescopic unit for maintaining said jack in retracted position, rotatable control bar means for placing said jack in operating position and for actuating said jack when in operating position, and means mounted on said vehicle for cooperating with said rotatable control bar to retain said jack in operating position.

2. In combination with a vehicle, a jack secured thereto and adapted for movement to operating or retracted position, a control bar for actuating said jack into operating position, means on the vehicle to engage said control bar to maintain said jack in operating position, cable means for raising said jack to retracted position, spring means mounted on said vehicle for engaging said jack in retracted position, an extensible telescopic unit associated with the outer end of said cable and spring latching means associated with the outer end of said telescopic unit for resiliently biasing said jack against said first mentioned spring means.

3. In combination with a vehicle having an axle, a jack, a pivot rigidly secured to the axle, supporting means connecting the jack with the pivot for movement in an arcuate path with respect to the axle whereby the jack may be selectively situated in an operative generally downward projecting position or in retracted position, a control arm projecting from the jack and arranged generally in the plane of said arcuate path, said control arm being link connected permanently with the operating mechanism of said jack and longitudinally shiftable to move the jack to operating position, said control link being supported on the vehicle at a point relatively remote from the jack and having means adjacent its end to permit positive longitudinal shifting action to bring the jack into operative position, and cable means secured to an intermediate point on said jack and extending over said axle for moving said jack to retracted position said cable means including a telescopic unit having a spring enclosed in a housing, and a second spring mounted on the housing of said unit for biasing said unit against extension.

4. In combination with a vehicle, a jack secured thereto and adapted for movement about a pivot to operating or retracted position, a control bar for actuating said jack to operating position, slotted means mounted on the vehicle engageable with cooperating means on said control bar to maintain said jack in operating position with respect to said vehicle, latch means to maintain said bar in said slotted means, a telescopic link having a spring enclosed within a housing, cable means connecting said telescopic link with said jack for raising said jack to retracted position upon disengagement of said control bar from said slotted means, and means provided on said housing for positively maintaining said link in telescoped position while the jack is in inoperative position.

5. In combination with a vehicle, a jack for raising and lowering the wheel of the vehicle, said jack being secured to the axle in proximity of the wheel and adapted for movement to operating or retracted position, a control bar for moving said jack to operating position and for actuating said jack in such position, means on the vehicle to engage said control bar to maintain said jack in operating position, cable means arranged for raising said jack to retracted position, spring means interconnecting said cable with a point on said vehicle for resiliently biasing said jack to retracted position, an extensible telescopic connection mounted between said cable and said spring means to permit said jack to be moved to operative position, said connection comprising a housing and a spring mounted therein, and latching means to hold said connection in telescoped position when the jack is in retracted position, and spring means mounted on said vehicle for engagement with said jack in retracted position for resiliently holding said jack in said position.

EDWARD J. LEARY.

REFERENCES CITED

The following references are of record in the file of this patent:

UNITED STATES PATENTS

| Number | Name | Date |
|---|---|---|
| 2,095,143 | Mahoney et al. | Oct. 5, 1937 |
| 2,143,181 | Barr | Jan. 10, 1939 |
| 2,168,906 | Leary | Aug. 8, 1939 |
| 2,169,913 | DeNault | Aug. 15, 1939 |

FOREIGN PATENTS

| Number | Country | Date |
|---|---|---|
| 630,927 | France | Dec. 12, 1927 |